(12) United States Patent
 Patel

(10) Patent No.: US 10,882,062 B2
(45) Date of Patent: Jan. 5, 2021

(54) HYDROPROCESSING SYSTEM WITH IMPROVED COOLING LIQUID ATOMIZATION

(71) Applicant: Spraying Systems Co., Wheaton, IL (US)

(72) Inventor: Bandish Patel, Carol Stream, IL (US)

(73) Assignee: Spraying Systems Co., Wheaton, IL (US)

( * ) Notice: Subject to any disclaimer, the term of this patent is extended or adjusted under 35 U.S.C. 154(b) by 0 days.

(21) Appl. No.: 16/658,852

(22) Filed: Oct. 21, 2019

(65) Prior Publication Data
 US 2020/0156094 A1    May 21, 2020

Related U.S. Application Data

(60) Provisional application No. 62/748,993, filed on Oct. 22, 2018.

(51) Int. Cl.
 *B05B 7/02* (2006.01)
 *B01J 4/00* (2006.01)
 (Continued)

(52) U.S. Cl.
 CPC ............. *B05B 7/0869* (2013.01); *B01J 4/002* (2013.01); *B01J 8/1827* (2013.01); *B01J 8/1836* (2013.01);
 (Continued)

(58) Field of Classification Search
 CPC ..... B01J 4/00; B01J 4/001; B01J 4/002; B01J 8/00; B01J 8/18; B01J 8/1818; B01J 8/1827; B01J 8/1836; B01J 8/24; B01J 2204/00; B01J 2204/007; B01J 2208/00;
 B01J 2208/00008; B01J 2208/00017; B01J 2208/00106; B01J 2208/00168; B01J 2208/00256; B01J 2208/00327; B01J 2208/00362; B01J 2208/00371; B01J 2208/00796; B01J 2208/00893; B01J 2208/00902; B01J 2208/00938; B05B 7/00; B05B 7/02; B05B 7/080869;
 (Continued)

(56) References Cited

U.S. PATENT DOCUMENTS 8,616,533 B2 * 12/2013 Jacobs .................... B01J 4/002
                                                       261/78.2

FOREIGN PATENT DOCUMENTS

WO       WO-0055281 A1 *  9/2000  ............ B01J 8/1827

* cited by examiner

*Primary Examiner* — Natasha E Young
(74) *Attorney, Agent, or Firm* — Leydig, Voit & Mayer, Ltd.

(57) ABSTRACT

A hydroprocessing system having a processing vessel that discharges a high temperature effluent that must be cooled prior to collection in a reflux drum. One or more gas assisted spray nozzle are provided that utilize light atomizing gas having a density of 8-15 times less than air, such as hydrogen, which preferably is the processing or recycle gas of the system. The spray nozzles are designed for the efficient atomization and direction of cooling water into a micron sized droplet distribution utilizing the light atomizing gas for affecting higher mass and heat transfer from the effluent. The spray nozzles each include a unique atomizing gas and cooling liquid passageway systems, a downstream impingement post, and a plurality of discharge orifices which sequentially breakdown the liquid into micron sized droplets as low as 500 microns and less.

20 Claims, 4 Drawing Sheets

(51) Int. Cl.
    *B01J 8/00*      (2006.01)
    *B01J 8/18*      (2006.01)
    *C10G 11/20*     (2006.01)
    *B05B 7/08*      (2006.01)

(52) U.S. Cl.
    CPC ......... *C10G 11/20* (2013.01); *B01J 2204/007* (2013.01); *B01J 2208/00371* (2013.01); *B01J 2208/00938* (2013.01); *C10G 2300/4006* (2013.01)

(58) Field of Classification Search
    CPC ........ C10G 11/00; C10G 11/20; C10G 47/00; C10G 47/24; C10G 47/30; C10G 2300/00; C10G 2300/40; C10G 2300/4006
    See application file for complete search history.

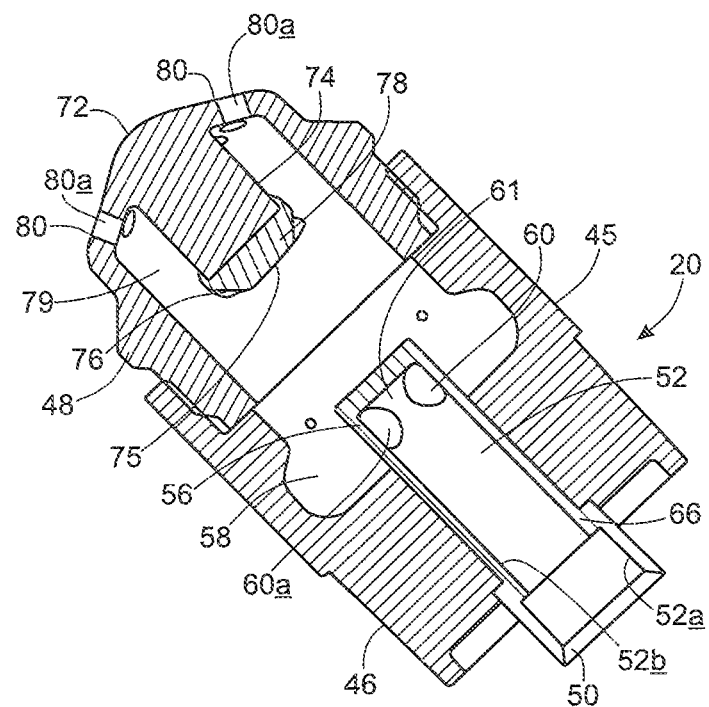
FIG. 6
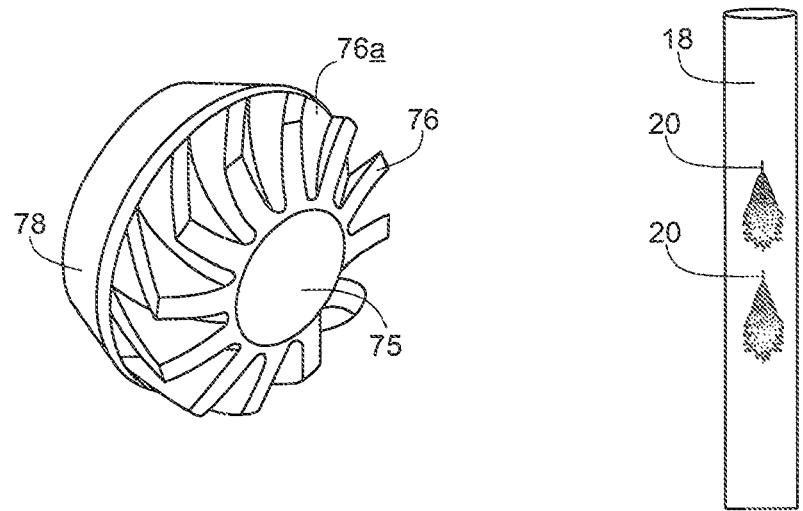
FIG. 7
FIG. 8

HYDROPROCESSING SYSTEM WITH
IMPROVED COOLING LIQUID
ATOMIZATION

This patent application claims the benefit of U.S. Provisional Patent Application No. 62/748,993, filed Oct. 22, 2018, which is incorporated by reference.

FIELD OF THE INVENTION

The present invention relates generally to processing systems that utilize processing gas substantially lighter than air, and more particularly, to a spraying system for atomizing liquids with such light processing gases.

BACKGROUND OF THE INVENTION

Numerous systems and methods are known in which fluid is injected into a gas phase using one or more spray nozzles to effect relatively fine distribution of the fluid in the gas stream. While most of these systems will operate satisfactorily for their intended purpose, problems often are encountered where the gas phase includes components that can deposit on, corrode, or plug the downstream flow path. For example, most known hydrotreating and hydrocracking units produce an effluent gas or gas/liquid mixture having a temperature above 250 F at pressures ranging from 400 to 2800 psig. The effluent typically contains varying concentrations of hydrogen sulfide, hydrogen chloride, and ammonia. To help prevent these compounds from forming corrosive solid deposits in downstream conduits and/or devices, wash water commonly is injected upstream of the reactor effluent air cooler (REAC) or water cooler. The wash water injection rate typically is adjusted such that a predetermined fraction of the injected water remains unvaporized. It is important that the unvaporized liquid be well distributed in the downstream flow path.

In most known configurations, wash water injection is typically performed using spray nozzles or injection quills that produce about millimeter-sized droplets. Unfortunately, such relatively large droplet size is typically associated with reduced heat and mass transfer and a high rate of gravity settling, leading to droplet coalescence and maldistribution of the injected water. Such problems are often associated with plugging of some of the heat exchanger tubes which simultaneously propagates corrosion while the remaining operating tubes will be subjected to high effluent flow and erosion corrosion. Moreover, for purposes of economy, it is desirable to use the processing gas in atomizing liquids in spraying systems associated with such processing, such as hydrogen gas used in hydrotreating and hydrocracking systems. Since hydrogen is very light, only about 1/10 the mass of air typically used in gas atomizing spraying systems, it has been difficult to use such light gas in effectively atomizing liquid, such as water, into fine particles necessary for efficient cooling.

Currently known configurations and methods for water injection in the hydrotreater/hydrocracker effluent have disadvantages that result in reduced heat and mass transfer, non-homogenous distribution of the water droplets, and/or disruption in operation. Thus, there is a need for improved configurations and methods for injection of fluids in such processing, and particularly in the injection of fluids atomized by light gases, such as hydrogen, used in the processing.

SUMMARY OF THE INVENTION

The subject invention relates to systems for processing and atomizing liquids utilizing gas, such as hydrogen, that is substantially lighter than air. More particularly, the invention relates to liquid spraying systems effective for atomizing liquids with such light gases for distribution into a reactor other vessel vapor effluent with micron size droplets. The atomizing gas preferably is the processing gas used in the formation of the effluent via recycle gas for the processing. The spray nozzles of the subject invention improve mass/heat transfer and reliability in effluent cooling, reducing the potential for downstream clogging and erosion/corrosion problems. In a preferred configuration and spray method, the effluent is treated with droplets, typically having a size of less than 1200 micron, and more typically less than 700 micron. The spray nozzles use processing or recycled gas having a density of 8-15 times less than air and are designed to effectively control mixed liquid and gas into micron-sized droplets. Because the nozzles create high shear between liquid and gas phases adjustment in gas velocity may be made to account for less mass flow with lighter hydrogen or recycle gas. In preferred embodiments, atomizing gas pressure is at least 50 psi (and more typically at least 100 psi), and/or the atomizing gas is process gas, hydrogen-containing recycle gas, or a hydrogen-rich make-up gas. Mass flow rate ratio between liquid and gas for best performance is between 12:1 and 8:1.

As used herein, the term "micron-sized droplets" refers to droplets with an average diameter of less than 1 millimeter, more typically less than 700 micron, and most typically less than 500 micron. The atomizing gas may be process gas or a slip stream of recycle gas and/or make-up gas from the discharge of compressors in the hydroprocessing process. With respect to the term "hydroprocessing", it should be understood to include all processes in which hydrogen is used as a reactant, typically at a pressure that is significantly above atmospheric pressure (e.g., above 100 psi). For example, suitable hydroprocessing processes include hydrotreating, hydrocracking, hydrofinishing, etc. As used herein, the term "light gas" means gases having a density 8-15 times less than air, and particularly including hydrogen.

Other objects and advantages of the invention will become apparent upon reading the following detailed description and upon reference to the drawings.

BRIEF DESCRIPTION OF THE DRAWINGS

FIG. 6 is a longitudinal section of the illustrated spray nozzle taken in the plane of line 6-6 in FIG. 5;

FIG. 7 is a perspective of a mixing pintel mounted on an impingement post of the illustrated spray nozzle; and FIG. 8 is a diagrammatic depiction of a plurality of spray nozzles according to the invention discharging cooling water into the vapor outlet line of the hydroprocessing system shown in FIG. 1.

Figure 1:
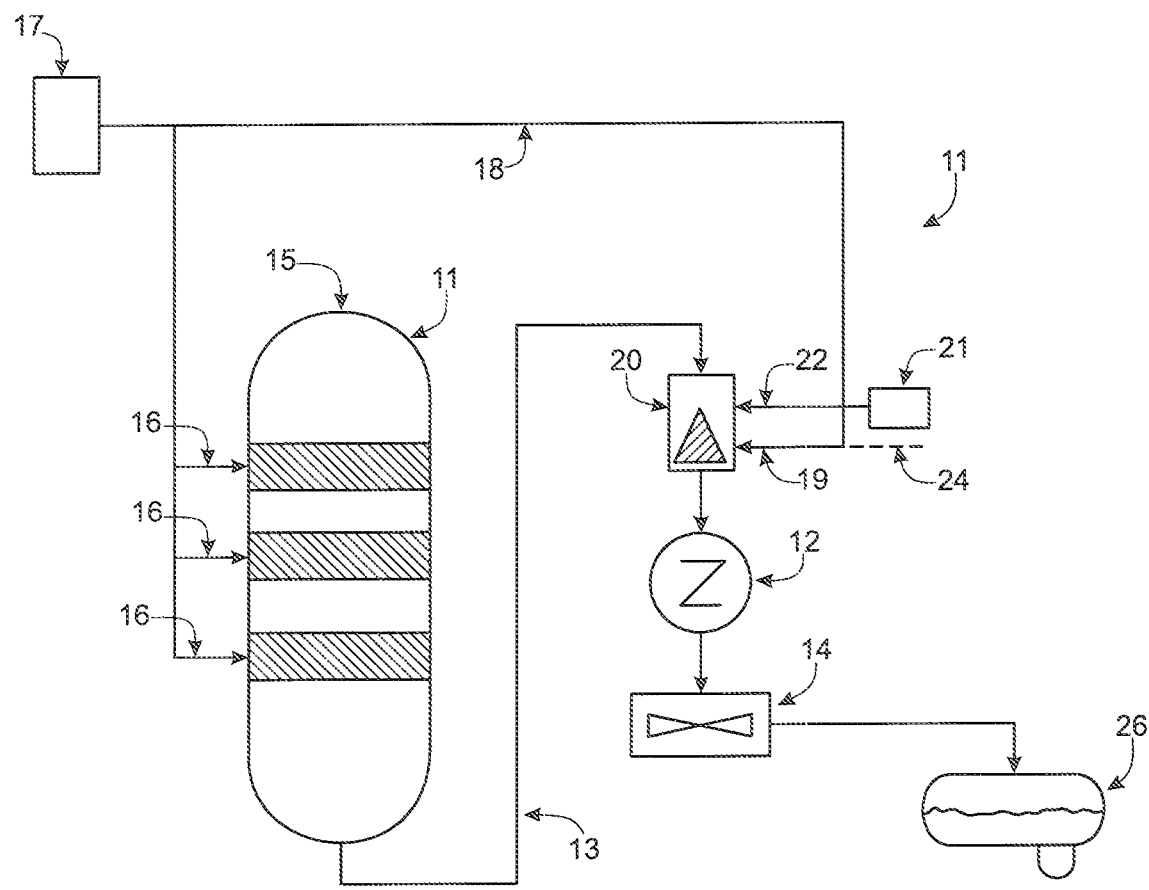
FIG. 1 is a diagrammatic depiction of an illustrative fluid catalytic cracking hydroprocessing system in accordance with the invention.

While the invention is susceptible of various modifications and alternative constructions, certain illustrative embodiments thereof have been shown in the drawings and will be described below in detail. It should be understood, however, that there is no intention to limit the invention to the specific forms disclosed, but on the contrary, the intention is to cover all modifications, alternative constructions, and equivalents falling within the spirit and scope of the invention.

DETAILED DESCRIPTION OF THE PREFERRED EMBODIMENTS

Referring now more particularly to FIG. 1 of the drawings, there is shown an illustrative hydroprocessing system, in this case a catalytic cracking system 10 in accordance with the invention. The illustrated catalytic cracking system 10 includes a fluid catalytic cracking reactor 11 the vapor stream flow of which is couple via discharge line 13 effluent coolers 12, 14. The reactor 11 has an effluent hydrocarbon feed stream coupled to a feed inlet 15 and a plurality of process gas inlets 16 coupled to a process gas supply 17. The remainder of the hydrogen gas stream from the gas supply 17 in this case is directed through line 18 to atomizing gas inlet 19 of a spray nozzle 20. Water from a wash water supply 21 is coupled to a liquid inlet 22 of the spray nozzle 20 for atomization by pressurized gas from the gas inlet 19 and direction to the downstream coolers 12, 14. Alternatively, the atomizing gas inlet 19 of the spray nozzle 20 may be coupled by line 24 for receiving recycled hydrogen containing gas from the reactor 15. It is understood that the atomizing gas may be suitably pressurized using a compressor. In an exemplary embodiment, one or more of the spray nozzles 20 are disposed within the vapor discharge line 13, as depicted in FIG. 8, for directing the atomized cooling water in the downstream direction toward said effluent coolers 12, 14. The cooled reactor effluent stream is directed from the coolers 12, 14 to a downstream reflux drum 26.

Figure 2:
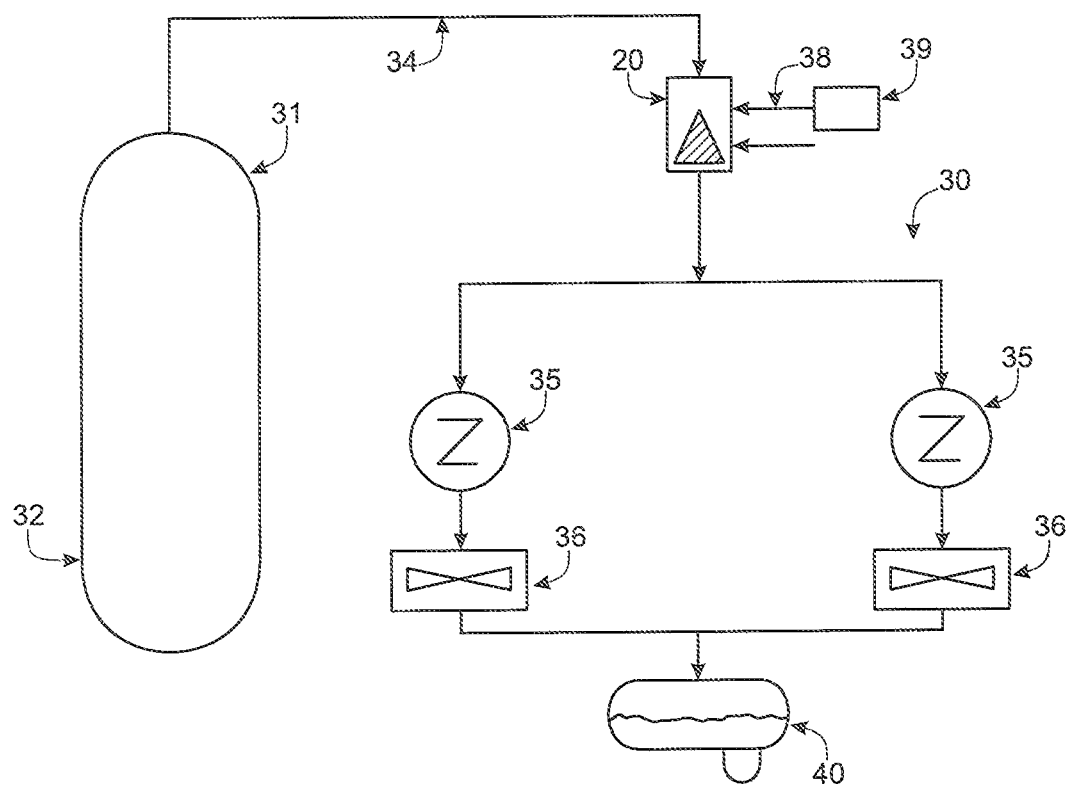
FIG. 2. is a diagrammatic depiction of a distillation hydroprocessing system according to the invention.
Figure 3:
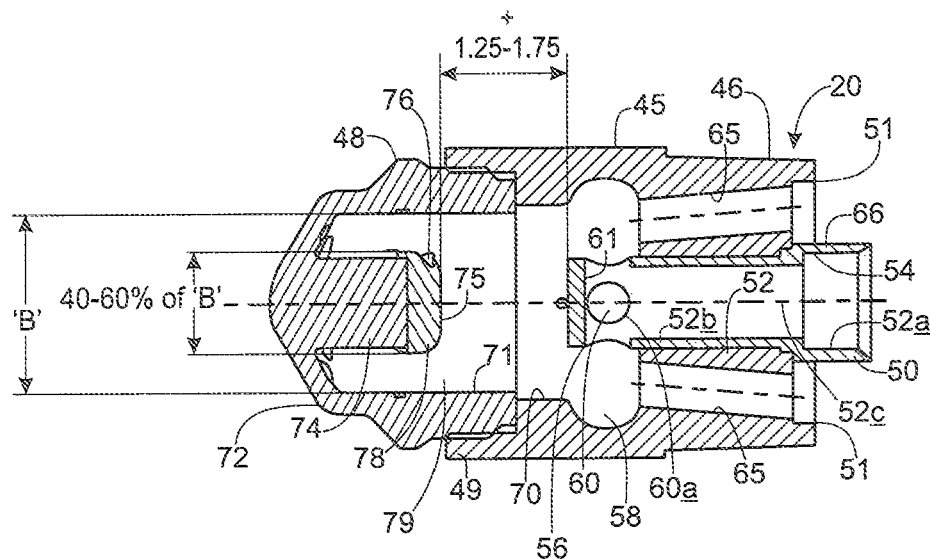
FIG. 3 is a longitudinal section, taken in the plane of line 8-A in FIG. 5, of an illustrative spray nozzle in accordance with the invention utilized in the hydroprocessing systems shown in FIGS. 1 and 2.
Figure 4:
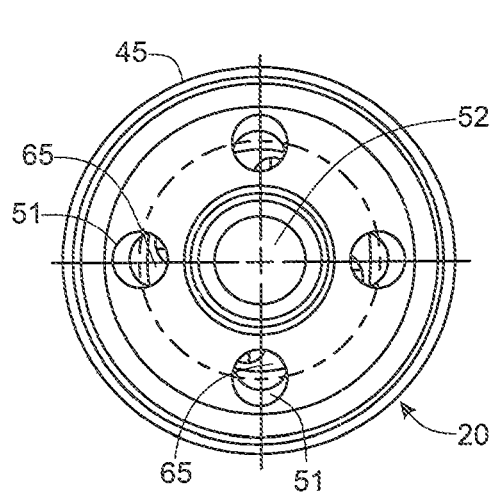
FIG. 4 is an upstream end view of the spray nozzle shown in FIG. 3.
Figure 5:
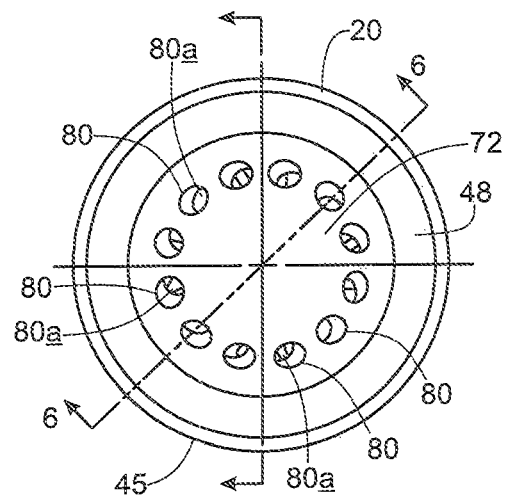
FIG. 5 is a downstream end view of the spray nozzle shown in FIG. 5.

Alternatively, by way of further example, the hydroprocessing system may be a distillation system 30, such as depicted in FIG. 2, that includes a distillation column 31 such as a crude unit for receiving a hydrocarbon feed at an inlet 32 and from which overheard vapors exit the column 31 by a line 34 for direction to overhead coolers 35, 36. One or more gas assisted nozzles 20 inject atomized liquid droplets into the overhead vapor from water inlet 22 coupled to a water inlet line 38 supplied from a water supply 39 and an atomizing gas inlet 19 coupled to a gas or vapor supply, which again may be a process gas used in processing of the feed or recovered from the downstream processing. The exiting overhead stream in this case is directed to coolers 35, 36 in multiple parallel flow paths and exits as cool vapor directed to a reflux drum 40.

In accordance with the invention, the spray nozzles 20 are designed for more efficiently atomizing and directing cooling liquid i.e. water, into a fine micron-sized droplet distribution into the reactor, cooling cooler column or the like in the hydrogen processing system for effecting high mass and heat transfer from the liquid spray and the more effective prevention of compounds of hydrogen sulfides, hydrogen chloride, and ammonia in a gas stream from forming corrosive deposits in downstream conduits and/or devices. The illustrated spray nozzles 20 have a nozzle body 45 comprised of an upstream annular mixing body 46 and a downstream nozzle cap 48 having a threaded connection 49 within a downstream end of a mixing body 46. The mixing body 46 has a central atomizing gas inlet 50 in this case communicating with a process gas supply line, such as line 18 or 34, and plurality of liquid inlets 51 disposed in circumferentially spaced relation about the atomizing gas inlet 50 coupling to a liquid supply, such as the water supplies 21 or 39. The atomizing gas inlet 50 in this case communicates with a central gas passage 52 having an enlarged diameter inlet passage section 52a communicating with a slightly smaller diameter, downstream gas passage section 52b extending centrally into the nozzle body 45. The large diameter inlet passage section 52a defines a shoulder 54 that can be fixedly located onto an appropriate gas supply line.

The central gas passage 52 in this case communicates into an extended protrusion 56 within the nozzle mixing body 46 disposed within an enlarged diameter, surrounding expansion chamber 58. The central gas passage 52 communicates via a plurality of circumferentially spaced cross holes 60, in this instance four in number, extending in radial intersecting relation to a central axis 52c in of the gas passage 52 which define respective atomizing gas discharge orifices 60a. The cross holes 60 further define an impingement surface 61 transverse to the axis 52c in of the central gas passage 52 for directing pressurized atomizing gas streams transversely outwardly through the gas discharge orifices 60a into the expansion chamber 58.

In carrying out this embodiment, the spray nozzle 20 is effective for directing a plurality of individual pressurized liquid flow streams, aligned with and corresponding in number to the radially directed gas discharge orifices 60a. To this end, the nozzle mixing body 46 is formed with a plurality of circumferentially offset liquid direction passages 65 surrounding the central gas passage 52 each for directing pressurized liquid transversely across a respective radial atomizing gas discharge orifice 60a for direct interaction with the atomizing gas flow streams for enhanced pre-atomization of the liquid and disbursement into and throughout the surrounding expansion chamber 58 for further liquid particle breakdown and atomization. In the illustrated embodiment, the plurality of liquid directing passages 65 about the central gas passage 52 has been unexpectedly found to minimize liquid pressure losses prior to discharge of liquid into the expansion chamber 58. The expansion chamber 58 preferably has a diameter of at least three times the diameter of the gas directing protrusion 56 from which the gas discharge orifices 60a communicate and an axial length corresponding to about that of the protrusion 56. To facilitate manufacture, the central gas passage 52 and protrusion 56 are defined by a common cylindrical insert 66 fixedly mounted within the mixing body 46.

Atomized liquid and atomizing gas directed from the protrusion 56 outwardly into the expansion chamber 58 communicate downstream through progressively slightly smaller diameter expansion chambers 70, 71 in the mixing body 46 and nozzle cap 48. For further atomizing the liquid, the nozzle cap 48 has an end wall 72 formed with an inwardly extending impingement post 74 having a flat impingement surface 75 transverse to the flow axis of the spray nozzle. The impingement surface 75 preferably has a diameter of between 40 and 60 percent of the diameter of the expansion chamber 71 within which it is disposed such that a substantial portion of the pre-atomized liquid impinges upon the impingement surface 75 and is directed radially outwardly and downstream of the impingement surface 75 for further liquid particle breakdown of the pre-atomization of fine liquid droplets.

For helically or angularly directing the atomized liquid and pressurized gas impinging upon the impingement surface 75 in a common rotative direction about the impingement post 74 and further enhancing liquid particle breakdown, the impingement post 74 has an outer angular array of curved angled vanes 76 that define a plurality of curved helical-like fluid directing channels 76a (FIG. 7) extending outwardly and downstream of the central impingement surface 75 in non-radial relation. To facilitate manufacture, the direction vanes 76 and impingement surface 75 are formed on a separate mixing pintel 78 fixed on an upstream end of the impingement post 74. The helically directed atomized liquid and pressurized gas progress into an annular passage section 79 surrounding the impingement post 74 for discharge from a circular array of liquid discharge orifices 80 in the end wall 72 of the nozzle cap 78. The discharge orifices 80 are defined by cylindrical passages 80a oriented at a compound angle to match rotation of flow from the impingement post vanes 76 and to discharge the very fine micron-sized atomized liquid in an outwardly expanding conical pattern with a tangential or transverse component. Preferably the nozzle cap 48 has at least six discharge orifices 80 and depending upon the size of the nozzle cap 48, most preferably between 6 and 12 discharge orifices. The downstream in-wall 72 of the nozzle cap in this case has a conical shape through which the passages 80a extend such that the atomized liquid discharges in a swirling outwardly expanding conical spray pattern.

From the foregoing, it can be seen that hydroprocessing systems are provided with the spray nozzles for directing liquid into very fine micron sized particles by use of atomizing gases substantially lighter than oxygen, such as hydrogen used in processing of the hydroprocessing system. The spray nozzle are particularly effective for dispensing cooling water for high mass heat transfer and for preventing hydrogen compounds and the like in the gas stream from forming corrosive deposits in downstream conduits or devices.

The invention claimed is:

1. A hydroprocessing system comprising:
  a processing vessel having a hydrocarbon inlet coupled to a hydrocarbon supply for directing hydrocarbon into the processing vessel,
  said processing vessel having a process gas inlet coupled to a light process gas supply for directing light process gas into said processing vessel;
  said processing vessel having a vapor outlet for directing high temperature vapor from the processing vessel to a vapor discharge line for direction to an effluent cooler;
  a spraying system for directing atomized cooling water into the high temperature vapor directed through said vapor discharge line;
  said spraying system including a spray nozzle having an atomizing gas inlet coupled to a light gas supply and a water inlet coupled to a cooling water supply;
  said nozzle body having an internal protrusion extending downstream within an enlarged diameter expansion chamber of said nozzle body, said protrusion having a central gas passage communicating with said atomizing gas inlet and spray nozzle light gas supply;
  said protrusion having a plurality of circumferentially spaced cross gas passages communicating with said central gas passage for discharging a plurality of atomizing gas streams transversely outwardly into said expansion chamber;
  said nozzle body having a plurality of circumferentially spaced water passages each for directing a pressurized water flow stream transversely across a respective cross gas passage for direct interaction with the atomizing gas stream discharging from the cross gas passage for pre-atomizing the water and the direction of the pre-atomized water into and throughout the expansion chamber;
  said nozzle body expansion chamber having an end wall formed with an inwardly extending impingement post having a transverse impingement surface against which pre-atomized water impinges for further liquid particle breakdown; and
  said nozzle body end wall being formed with a plurality of circumferentially spaced discharge orifices disposed in surrounding relation to said impingement post for further atomizing the cooling water into micron sized atomized particles for discharge into vapor communicated through said vapor discharge line for preliminary cooling said vapor prior to said effluent cooler.

2. The hydroprocessing system of claim 1 wherein said processing vessel is a fluid catalytic reactor.

3. The hydroprocessing system of claim 1 wherein said spray nozzle light gas supply is a supply of said light process gas.

4. The hydroprocessing system of claim 1 wherein said spray nozzle light gas supply includes recycled hydrogen gas from said processing vessel.

5. The hydroprocessing system of claim 1 wherein said spray nozzle atomizes liquid droplets with an average diameter of less than one millimeter.

6. The hydroprocessing system of claim 4 wherein said spray nozzle atomizes liquid droplets with an average diameter of less than 700 microns.

7. The hydroprocessing system of claim 4 wherein said spray nozzle atomizes liquid droplets with an average diameter of less than 500 microns.

8. The hydroprocessing system of claim 1 wherein the impingement surface of impingement post has an outer angular array of curved vanes that define a plurality of curved acute flow directing channels for directing atomized water particles in a circular flow pattern.

9. The hydroprocessing system of claim 8 wherein said expansion chamber end wall discharge orifices are oriented at a compound angle to match the circular flow pattern of atomized water from the impingement post for discharging the fine micron sized atomized water into an outwardly expanding conical pattern with a tangential component of movement.

10. The hydroprocessing system of claim 1 wherein said expansion chamber of said nozzle body has a diameter of at least three times the diameter of said protrusion.

11. The hydroprocessing system of claim 1 wherein said impingement surface of said protrusion has a diameter between 40 and 60 percent of the diameter of said expansion chamber.

12. A hydroprocessing system comprising:
  a processing vessel in the form of a fluid catalytic reactor having a hydrocarbon inlet coupled to a hydrocarbon supply for directing hydrocarbon into the processing vessel,
  said processing vessel having a process gas inlet coupled to a light process gas supply for directing light process gas into said processing vessel;
  said processing vessel having a vapor outlet for directing high temperature vapor from the processing vessel to a vapor discharge line for direction to an effluent cooler;
  a spraying system for directing atomized cooling water into the high temperature vapor directed through said vapor discharge line;

said spraying system including a spray nozzle having an atomizing gas inlet coupled to a light gas supply and a water inlet coupled to a cooling water supply;

said nozzle body having an internal protrusion extending downstream within an enlarged diameter expansion chamber of said nozzle body, said protrusion having a central gas passage communicating with said atomizing gas inlet and spray nozzle light gas supply;

said protrusion having a plurality of circumferentially spaced cross gas passages communicating with said central gas passage for discharging a plurality of atomizing gas streams transversely outwardly into said expansion chamber;

said nozzle body having a plurality of circumferentially spaced water passages each for directing a pressurized water flow stream transversely across a respective cross gas passage for direct interaction with the atomizing gas stream discharging from the cross gas passage for pre-atomizing the water and the direction of the pre-atomized water into and throughout the expansion chamber;

said nozzle body expansion chamber having an end wall formed with an inwardly extending impingement post having a transverse impingement surface against which pre-atomized water impinges for further liquid particle breakdown; and said nozzle body end wall being formed with a plurality of circumferentially spaced discharge orifices disposed in surrounding relation to said impingement post for further atomizing the cooling water into micron sized atomized particles with an average diameter of less than 700 microns for discharge in a conical spray pattern into vapor communicated through said vapor discharge line for preliminary cooling of said vapor prior to said effluent cooler.

13. The hydroprocessing system of claim 12 wherein said spray nozzle light gas supply is a supply of said light process gas.

14. The hydroprocessing system of claim 12 wherein the impingement surface of impingement post has an outer angular array of curved vanes that define a plurality of curved acute flow directing channels for directing atomized water particles in a circular flow patter, and said expansion chamber end wall discharge orifices are oriented at a compound angle to match the circular flow pattern of atomized water from the impingement post for discharging the fine micron sized atomized water in an outwardly expanding conical pattern with a tangential component of movement.

15. The hydroprocessing system of claim 12 wherein said expansion chamber of said nozzle body has a diameter of at least three times the diameter of said protrusion, and said impingement surface has a diameter between 40 and 60 percent of the diameter of said expansion chamber.

16. A hydroprocessing system comprising:
a processing vessel in the form of a distillation column having a hydrocarbon inlet coupled to a hydrocarbon supply for directing hydrocarbon into the processing vessel, said processing vessel having a vapor outlet for directing high temperature vapor from the processing vessel to a vapor discharge line for direction to an effluent cooler;

a spraying system for directing atomized cooling water into the high temperature vapor directed through said vapor discharge line;

said spraying system including a spray nozzle having an atomizing gas inlet coupled to a light gas supply and a water inlet coupled to a cooling water supply;

said nozzle body having an internal protrusion extending downstream within an enlarged diameter expansion chamber of said nozzle body, said protrusion having a central gas passage communicating with said atomizing gas inlet and spray nozzle light gas supply;

said protrusion having a plurality of circumferentially spaced cross gas passages communicating with said central gas passage for discharging a plurality of atomizing gas streams transversely outwardly into said expansion chamber;

said nozzle body having a plurality of circumferentially spaced water passages each for directing a pressurized water flow stream transversely across a respective cross gas passage for direct interaction with the atomizing gas stream discharging from the cross gas passage for pre-atomizing the water and the direction of the pre-atomized water into and throughout the expansion chamber;

said nozzle body expansion chamber having an end wall formed with an inwardly extending impingement post having a transverse impingement surface against which pre-atomized water impinges for further liquid particle breakdown;

said nozzle body end wall being formed with a plurality of circumferentially spaced discharge orifices disposed in surrounding relation to said impingement post for further atomizing the cooling water into micron sized atomized particles with an average diameter of less than 700 microns for discharge into vapor communicated through said vapor discharge line for preliminary cooling of the vapor prior to said effluent cooler.

17. The hydroprocessing system of claim 16 wherein said spray nozzle atomizes liquid droplets with an average diameter of less than 500 micron.

18. The hydroprocessing system of claim 14 wherein the impingement surface of impingement post has an outer angular array of curved vanes that define a plurality of curved acute flow directing channels for directing atomized water particles in a circular flow pattern, and said expansion chamber end wall discharge orifices are oriented at a compound angle to match the circular flow pattern of atomized water from the impingement post for discharging the fine micron sized atomized water into an outwardly expanding conical pattern with a tangential component of movement.

19. The hydroprocessing system of claim 18 wherein said nozzle impingement surface has a diameter between 40 and 60 percent of the diameter of said expansion chamber.

20. The hydroprocessing system of claim 19 wherein said nozzle impingement surface has a diameter between 40 and 60 percent of the diameter of said expansion chamber.

* * * * *